Jan. 21, 1958   A. L. SAXTON   2,820,700
FLUID CONTACTING APPARATUS
Filed Sept. 24, 1954   2 Sheets-Sheet 1

Arthur L. Saxton  Inventor
By J. A. Reilly  Attorney

Jan. 21, 1958 A. L. SAXTON 2,820,700
FLUID CONTACTING APPARATUS
Filed Sept. 24, 1954 2 Sheets-Sheet 2

Arthur L. Saxton   Inventor
By J. A. Reilly   Attorney

United States Patent Office 2,820,700
Patented Jan. 21, 1958

2,820,700

FLUID CONTACTING APPARATUS

Arthur L. Saxton, Warren Township, Somerset County, N. J., assignor to Esso Research and Engineering Company, a corporation of Delaware Application September 24, 1954, Serial No. 458,248

4 Claims. (Cl. 23—270.5)

The present invention relates to an apparatus for counter-currently contacting two incompletely immiscible fluid phases having different densities. The invention has particular application in fluid-fluid contacting processes in which one of the fluids is present throughout the apparatus or process as a continuous fluid phase, and the other fluid is present as a discontinuous fluid phase. The fluids may comprise liquids, gases, mixtures of gases, mixtures of liquids, suspensions, emulsions, etc. The invention has particular application to liquid-liquid contacting operations such as washing or extraction processes and to liquid-vapor operations such as distillation, scrubbing, absorption, stripping, evaporation, humidification, etc.

Apparatus for intimately contacting two or more fluids that are at least partially immiscible and possess different densities are well known and are widely employed for fractional separation type processes. As mentioned above, it is well known to contact a liquid with either a vapor or another liquid. In either case, it is generally desired to transfer at least a portion of the material contained in one of the fluids into the other fluid. In some instances, it is desired to segregate or otherwise remove a valuable material which is contained in one of the fluids. In still other instances it may be desired to remove impurities or undesirable materials from one or more of the fluids treated.

It is apparent and is well recognized in the art that processes which call for the contacting of two liquid phases will generally require somewhat different equipment or apparatus than processes in which a liquid and a vapor are contacted. It will be noted, however, that an identical type of apparatus may often satisfy both types of operations.

In the field of liquid-liquid contacting, it has been the practice in the art to employ one of two major forms of apparatus. The first form has consisted of a series of separate mixing and settling zones connected with each other by means of suitable conduits such as piping, tubing, pumps and the like. This form of apparatus has the disadvantage that it is generally very expensive, complex, difficult to maintain and expensive to operate, particularly where more than one mixing and settling section are required.

A second form of liquid-liquid contacting apparatus is the multi-stage contacting tower which is widely employed in the art. The tower may be either of the packed-type or the plate-type of design. In the former type of tower, packing in the form of Berl saddles, Raschig rings, wire mesh, particulate solids and the like is provided within the tower and serves as a suitable surface for the contacting of the two liquids. In the second type of liquid-liquid tower, metallic plates—perforate or imperforate—are placed within the tower and serve to divide the tower into a series of vertically superposed treating stages.

In the tower form of apparatus, the heavier liquid is generally introduced within the top of the tower and permitted to flow down through the tower. The lighter liquid, on the other hand, enters the bottom of the tower, flows up through the tower and leaves through a suitable opening in the top of the tower. Thus, the overall contacting operation in the tower type of contactor is counter-current, although concurrent mixing and settling may occur in each stage.

At this point it might be noted that the term "stage efficiency" is generally employed to indicate the effectiveness of a given stage in comparison with the degree of contact that is realized under equilibrium conditions in a single stage batch mixer and settler. This term has been applied to both liquid-liquid operations and vapor-liquid operations. In the latter instance, it is more generally designated as "plate efficiency" rather than "stage efficiency." In either case, the term denotes a comparison with the efficiency of one theoretical stage or plate.

One theoretical stage or plate is established by contacting two fluid phases intimately to equilibrium in a suitable mixer followed by a thorough and complete phase separation. The term "plate" or "stage efficiency" is then considered to mean the percentage of the degree of contacting that is realized in a given plate or stage as compared to the equilibrium degree of contacting which is realized in a single theoretical stage or plate.

In vapor-liquid operations, the use of vertical towers is almost unanimous among those skilled in the art. In such operations the towers may be provided with a contacting surface in the form of various packing materials, including those enumerated above in connection with liquid-liquid operations. Alternatively, vapor-liquid towers may be provided with contact devices such as bubble cap plates, perforated plates, grids, etc.

In general, vertical towers are preferred over batch-style devices for the contacting of either liquid-liquid or vapor-liquid systems. But these towers still possess a number of disadvantages. First, they are still relatively expensive to construct and often difficult to maintain. Second, in large installations it is necessary to fabricate the towers almost entirely from specially manufactured pieces. As a result, they are very costly to erect. Third, tower sizes and capacities are generally limited by the fluid velocities which can be maintained without incurring excessive entrainment of one phase in the other. Fourth, most towers are built with a cylindrical shell to take advantage of the strength that is inherent in this design; although the geometry of a round tower prevents designing for the most efficient performance of the two fundamental operations—mixing and settling.

Accordingly, it is an object of the present invention to overcome the shortcomings of batch-type and tower-type forms of fluid-fluid contacting apparatus. It is a particular object of the invention to provide an apparatus which is inexpensive to erect and inexpensive to maintain. It is a further object of the invention to provide an apparatus which can be fabricated from commercially and readily available articles of construction. It is still a further object of the invention to provide an apparatus which, for a given volume of fluid handled, is smaller in size than a batch-type or tower-type of apparatus.

In liquid-liquid contacting processes, it is a particular object of the invention to provide an apparatus which can be easily adapted to utilize mixing aids as well as settling aids. And in vapor-liquid processes it is a particular object of the invention to provide an apparatus which is capable of markedly increased vapor velocity, particularly in comparison with tower-types of contacting apparatus.

The present invention realizes these objectives by the use of a plurality of contacting stages in which each of the stages comprises an elongated, substantially horizontal, tubular member. It is preferred that the members be vertically spaced from one another and that adjacent members be connected by means of U-bends or other return-type conduits to form a continuous, serpentine fluid passageway. Thus, any given member is connected at one end to the corresponding adjacent end of a tubular member on one side of the given member; and it is connected at its opposite end to the corresponding end of a tubular member on the opposite side of the given member. In other words, each member is connected to adjacent members at both ends.

Each horizontal tubular member of the present apparatus constitutes a separate treating stage and comprises a mixing zone and a phase separation zone.

As mentioned earlier, the present apparatus is particularly desirable for use in processes which employ a continuous phase fluid and a discontinuous phase fluid. The term "continuous phase," as used herein, is intended to mean that the fluid so designated exists as a continuous phase from its entrance within the apparatus to its exit therefrom. From this definition it is apparent that the term "discontinuous phase" implies a break in the continuity of a phase within the apparatus.

In accordance with the present invention, suitable conduit means are provided for introducing the continuous phase fluid within the open end of one of the terminally-located, horizontal tubular members or stages. Other suitable conduit means are provided at the opposite terminal tubular member or stage for withdrawing the contacted continuous phase fluid from the apparatus. If the continuous phase fluid is the lighter of the two fluids, it is particularly contemplated that this fluid be introduced within the bottommost contacting stage. Conversely, if the continuous phase fluid is the heavier of the two fluids, it is desired that the fluid be introduced within the topmost contacting stage. It is further desired that suitable conduit means be provided for supplying and withdrawing the discontinuous phase fluid to and from the apparatus. It is additionally desired that the discontinuous phase fluid be introduced within the apparatus at a vertically opposite position from the point of introduction for the continuous phase fluid. In other words, it is desired that the overall flow-relationship between the two fluids be a countercurrent one, even though substantially concurrent flow conditions may be maintained within the individual stages.

As mentioned above, the continuous phase fluid flows directly and continuously through the present apparatus. In other words, this liquid flows sequentially through the mixing zone and the settling zone of the first stage it enters and then via a U-shaped conduit member directly into the mixing zone of the next contacting stage. The discontinuous phase fluid, on the other hand, flows sequentially through the mixing zone of the first contacting stage it enters; but it is then conveyed to the mixing zone of its next contacting stage by means of a conduit which is entirely separate from the overall tubular flow-path.

To recapitulate briefly, the discontinuous phase fluid, upon entering its first contacting stage, is intimately dispersed throughout the stream of continuous phase fluid by means of a suitable dispersion device. The resulting dispersion or mixture is then separated during its substantially horizontal travel path through the separation zone of the first stage. The separated, discontinuous phase fluid is collected and transmitted to the mixing zone of the next adjacent stage where it is again dispersed throughout the continuous phase fluid and the entire procedure repeated.

At this point it would be well to note that it is common in a countercurrent extraction or fractionation process that the internal flow rates vary throughout the extractor or fractionator. Thus, a varying requirement exists for settling. In a cylindrical tower this can be provided by changing the diameter; however, such changes complicate both design and construction. In the present apparatus, on the other hand, varying settling requirements may be easily provided for by changing the length of individual tubular sections. This feature is of special advantage where increased capacity may be desired in an existing unit of this type. Any desired incremental length can be added to those horizontal sections which require additional settling capacity.

A major advantage is inherent in the shape of the present apparatus which permits carrying out the mixing and separating functions in distinct zones. Thus, appropriate mixing and settling devices can be employed without a conflict between the two as is encountered in a tower type apparatus.

An additional advantage of the present apparatus lies in the fact that it may be constructed of commercially available pipe, tubing, conduits, fittings, etc.

These and other advantages will be apparent from the attached figures and the following description of the best form that is contemplated for practising the present invention. The attached figures illustrate preferred forms of the apparatus.

Figure 1:
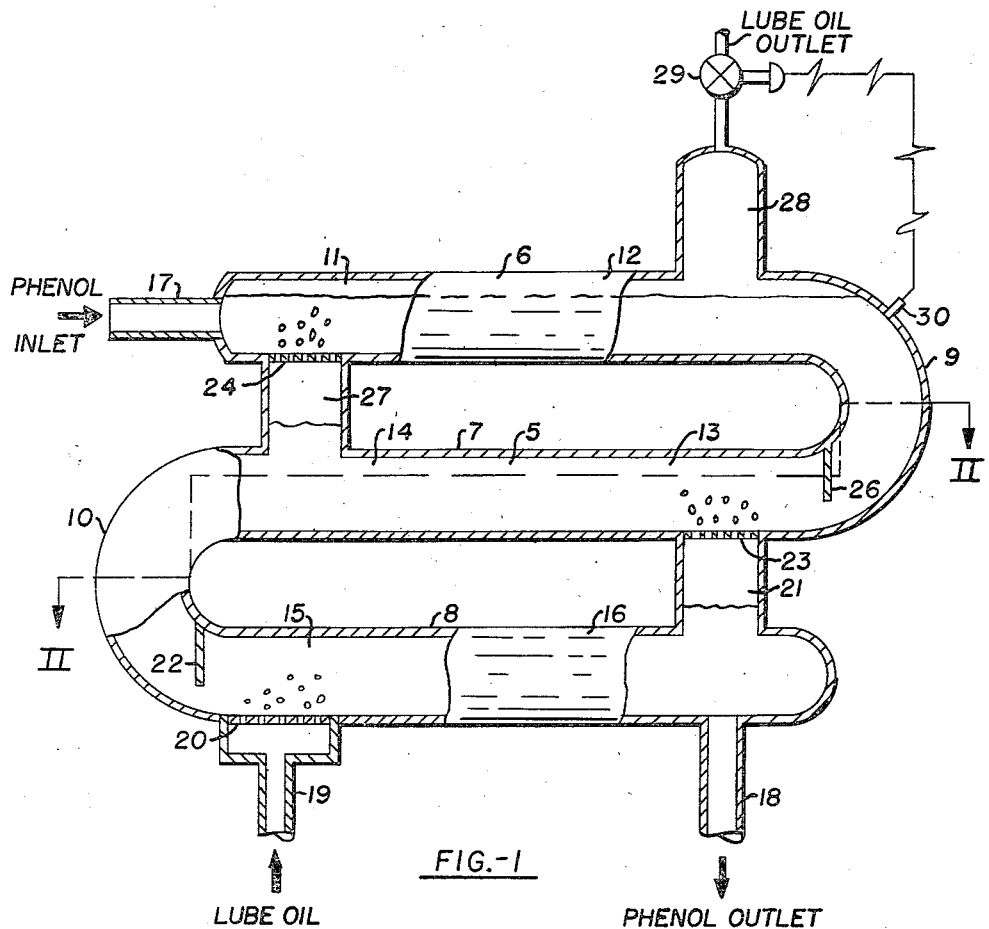
Fig. 1 depicts a vertical view, partially sectional, of a liquid-liquid apparatus which utilizes the teachings of the present invention.
Figure 4:
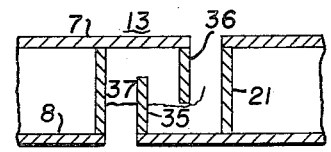

Fig. 4 is a fragmentary, vertical, sectional view of conduit 21 and portions of members 7 and 8, of Fig. 1, illustrating a baffle and weir arrangement in place of perforated plate 23.

Figure 5:
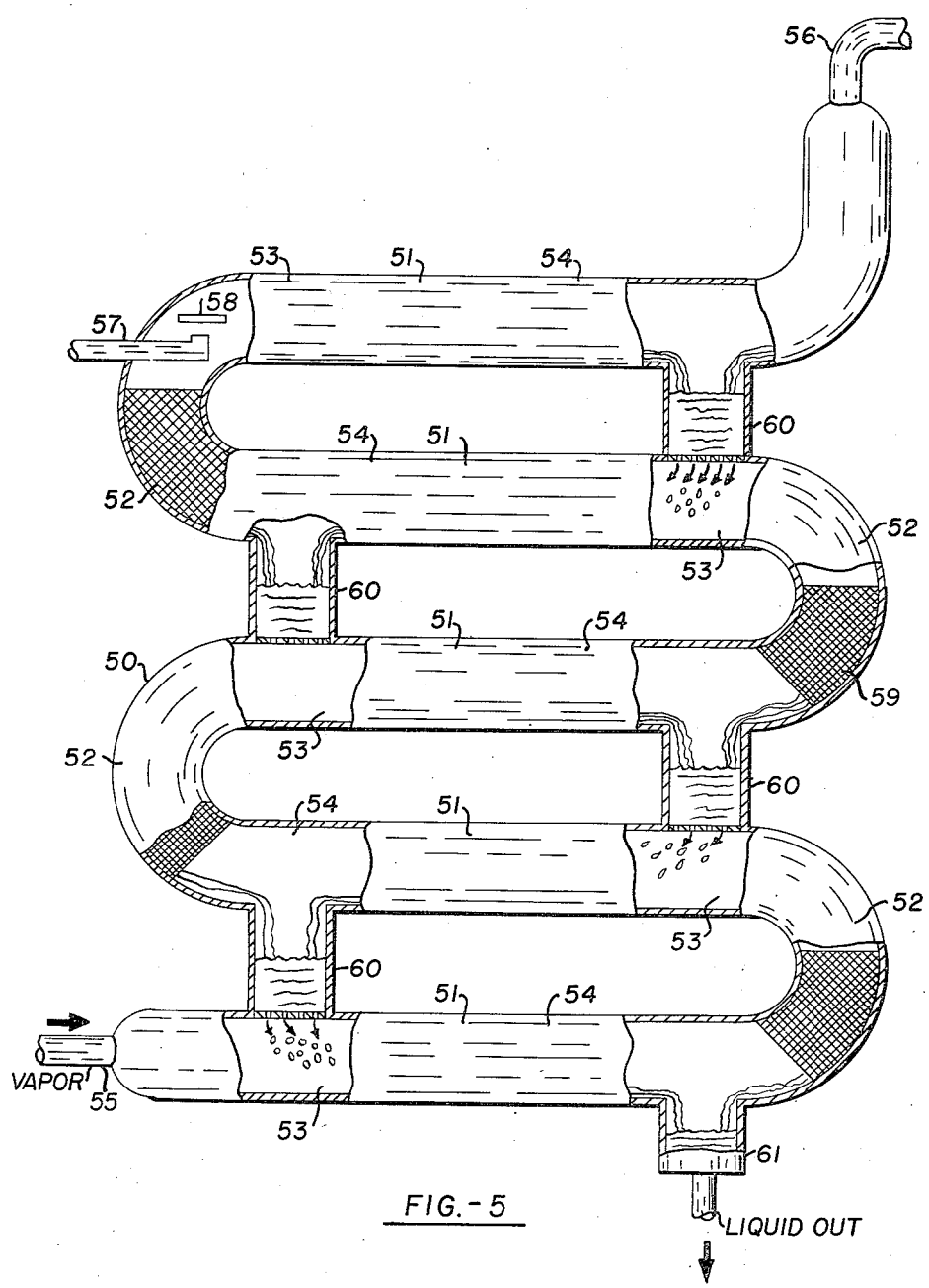

Fig. 5 is a vertical, partially sectional view of an apparatus which is suitable for the contacting of a vapor with a liquid.

Figure 2:
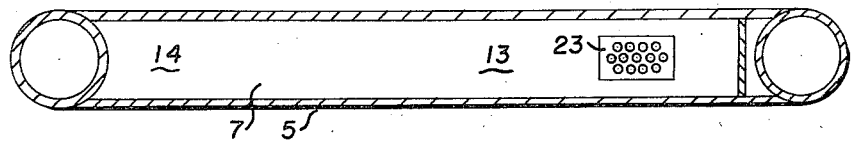
Fig. 2 is a cross-sectional view of Fig. 1 taken along the lines II—II of Fig. 1.

Referring specifically to Figures 1 and 2, it will be observed that the apparatus shown therein comprises an elongated serpentine tubular assembly 5. Assembly 5 is made up of horizontally disposed tubular members 6, 7 and 8 which are sequentially connected to each other by means of U-shaped tubular conduits 9 and 10. Each of the horizontal, tubular members 6, 7 and 8 constitutes a separate treating stage and is divided laterally into a mixing zone and a separation zone. Thus, stage 6 is divided into mixing zone 11 and settling zone 12; stage 7 into mixing zone 13 and settling zone 14; and stage 8 into mixing zone 15 and separation zone 16. It will be particularly observed that the mixing zones of adjacent stages are laterally opposed to one another.

In describing the apparatus in Fig. 1, it will be considered that the continuous phase liquid in the apparatus is the heavier of the two liquids and that the discontinuous phase liquid is the lighter of the two liquids. For the purpose of further clarification, it will additionally be considered that the particular liquid-liquid system is one in which the heavier liquid is phenol and the lighter liquid a petroleum fraction and especially a lubricating oil fraction. It will be recalled that the phenol treating or extraction of lubricating oil is a process which has wide application in the field of petroleum refining. The present invention, however, is not limited in application to this particular process, nor is it limited to the field of petroleum refining. Rather, this process is merely to serve as an illustration of the principles which are taught and utilized by the present invention.

Assuming, as described above, that the apparatus in Fig. 1 is operated on phenol and oil, it will be observed that phenol is introduced by means of conduit 17 within the mixing zone 11 of stage 6. From this point it flows continuously through the entire tubular assembly 5 in the form of a continuous phase and is withdrawn from the separation or settling zone 16 of stage 8 by means of outlet conduit 18.

A lubricating oil fraction is introduced by means of conduit 19 into the mixing zone 15 of stage 8. As it enters mixing zone 15, the lube oil is preferably intimately dispersed throughout the phenol stream by means of a suitable dispersion device such as perforated plate 20. In passing through the perforations of plate 20, the lube oil is jetted into the phenol stream and thereby intimately mixed with the phenol. The resulting phenol-oil mixture flows laterally from mixing zone 15 into settling zone 16 where the phenol and oil are separated into two separate phases. The oil phase, being the lighter of the two phases, rises and collects within transfer conduit 21. The phenol, on the other hand, settles and is withdrawn through conduit 18 as described earlier.

In Fig. 1, it will be observed that a phase interface is depicted within transfer conduit 21. It will be noted, however, that the interface may actually exist within settling zone 16 on occasion. For this reason it is preferred that a suitable baffle be provided within each contacting stage in order to prevent the discontinuous phase liquid from bypassing any of the stages. Stage 8 is provided with baffle 22 to serve this very purpose.

It is also necessary in the apparatus of Fig. 1 to prevent phenol from bypassing any of the contacting stages. For example, it is necessary to prevent phenol from bypassing stage 7 by flowing directly from conduit 9 through perforated plate 23 into conduit 21 and stage 8. This requirement is met by continuously maintaining a layer of oil beneath perforated plate 23. The oil layer serves to seal stage 7 from stage 8 and to prevent phenol from bypassing these stages. It is apparent that the perforations in plate 23 must be critically sized so as to provide (1) adequate dispersion of the lube oil from conduit 21 within the phenol stream in mixing zone 13 of stage 7; (2) a liquid seal between stages 7 and 8 that prevents phenol from bypassing these stages. Similar perforations are used for exactly the same purposes in vertical cylindrical extraction towers which are in common use. Thus the method of sizing such perforations is well established and understood by those persons with normal skill in the art.

Perforated dispersion plates 23 and 24 are shown in Fig. 1 at the top of conduits 21 and 27. This does not preclude the location of these dispersion plates at the bottom of the conduits or at some intermediate level.

Figure 3:
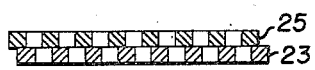
Fig. 3 illustrates a variable dispersion area device adapted to disperse the discontinuous phase liquid throughout the continuous phase liquid.

The critical sizing of the perforations in plate 23 of stage 7 (and also plate 24 of stage 6) may be relaxed by the use of a dispersion device which is characterized by possessing variably sized perforations. A device of this type is illustrated in Fig. 3 and consists of two perforated plates which are movable with respect to each other. In Fig. 3 the lower plate 23 corresponds to the perforated plate 23 of stage 7 in Figures 1 and 2. Plate 25 constitutes a second perforated plate which is of substantially the same dimensions and construction as plate 23. Plate 25, however, may be moved with respect to plate 23, thereby effectively varying the size of the perforations in plate 23.

Other types of liquid seals and dispersion means may also be employed in the present apapartus in place of the perforated plates that are illustrated in Figures 1, 2 and 3. For example, a system of baffles and weirs such as is illustrated in Fig. 4 is very suitable for use.

Referring to Fig. 4, it will be seen that conduit 21 (of Fig. 1) has therein been provided with a baffle member 35 and a weir member 36. Both of these members are vertically disposed and are laterally spaced within conduit 21 to form a tortuous fluid passageway through which the oil from settling zone 16 must pass in order to enter mixing zone 13. Furthermore, the upper edge of baffle 35 vertically overlaps the lower edge of weir member 36 so that an oil seal 37 is formed and continuously maintained within conduit 21. Thus, oil from setting zone 16 rises and passes through an oil-phenol interface to enter seal chamber 37. From this point the oil then flows vertically downward, spills over the weir edge of weir and rises into mixing zone 13.

The weir edge of member 36 may be a straight-edge weir, although it is preferably a notched weir since the notches assist in dispersing the oil throughout the phenol as the former liquid enters the mixing zone 13. V-type notches are particularly preferred.

Lube oil upon passing through plate 23 is intimately mixed with phenol which enters mixing zone 13 from transfer conduit 9. The tube oil is prevented from bypassing mixing zone 13 and stage 7 by means of a substantially vertical baffle 26 which partially separates conduit 9 from mixing zone 13. The mixture of oil and phenol within mixing zone 13 flows laterally to settling zone 14 where the mixture is separated into distinct oil and phenol layers. The phenol continues its passage through the apparatus by means of U-shaped conduit 10 into stage 8. The oil, on the other hand, collects within transfer conduit 27. It will be noted that oil is prevented from rising through transfer conduit 9 by means of the baffle 26.

As in stage 7, the oil in conduit 27 enters mixing zone 11 of stage 6 by jetting through the perforations in plate 24. Once again, the oil layer between stage 7 and stage 6 is maintained at a depth such that (1) phenol is prevented from bypassing these stages and (2) the head of oil is sufficient to provide good mixing by the jetting action.

As before, the oil and phenol mixture in mixing zone 11 flows laterally through stage 6 into separation zone 12 where it is settled into separate oil and phenol layers. The phenol continues through conduit 9 into stage 7. The oil collects at the top of settling zone 12 and is withdrawn from the apparatus by means of conduit 28. Conduit 28 is preferably provided with a suitable valve 29 which is automatically operated in response to the signals which are generated by pressure controller 30. Such controllers and valves are well known in the art, and a detailed discussion of them is not considered to be necessary in the present description. It will be noted that conduits 17, 19 and 18 may also be provided with suitable flow controllers.

The following will illustrate the economic advantage of this invention over the most favored type of conventional equipment. Comparative designs and cost estimates were prepared for a conventional perforated plate type tower and a tubular extractor according to the present invention. The comparison is conservative to the extent that no advantage was taken of the more efficient settling to be obtained in the tubular unit by virtue of its more favorable geometry compared with the tower. That is, identical settling rates were used for sizing both types of equipment although somewhat higher effective settling rates can be obtained in the tubular extractor. Approximately 20% lower investment is required for the tubular extractor on this conservative basis. Pertinent size figures are as follows:

| Description | Tower Unit | Tubular Unit |
|---|---|---|
| | 9' dia. x 15' high 3 perforated trays. | 5—2' dia. x 50' long sections. |

It will be appreciated that the apparatus illustrated in Figures 1 through 3 may be modified substantially without varying from the scope or spirit of the present invention. Thus, the tubular members and conduits, while preferably circular in cross section, may be of any suitable geometric form. Furthermore, the mixing zones of the various stages may be provided with mechanical mixing devices such as propellers, vibrators, vibrating perforated plates, etc. or with packing material such as Raschig rings, wire mesh, particulate solids and the like. Likewise, the settling zones may be provided with settling aids in the form of suitable baffle plates, porous packing, screens, etc. The zones may also be inclined or depressed slightly from the horizontal in order to promote the flow of one or other of the liquids; and the cross-sectional area of the mixing zones may be smaller or greater than the cross-sectional areas of their respective settling zones. The contacting stages themselves may be constructed in varying sizes, if so desired; and the tubular sections may be U-shaped in a horizontal plane if desirable because of area limitations.

Turning next to Fig. 5, it will be observed that the apparatus illustrated therein is adapted for the contacting of a vapor with a liquid. The apparatus in Fig. 5 is similar to that in Figures 1–4 in that it is a continuous, elongated, serpentine, tubular assembly 50 made up primarily of substantially horizontal tubular members 51 which are sequentially connected by means of U-shaped tubular conduits 52. Each horizontal tubular member constitutes a separate contacting stage, each stage being made up of a mixing zone 53 and a separation zone 54. It will be observed that the mixing zones of adjacent stages are laterally opposite from one another.

For the purpose of the present description, it will be assumed that the vapor constitutes the continuous stage fluid in the apparatus of Fig. 5 and that the liquid constitutes the discontinuous phase fluid. It will be further assumed that the vapor is lighter in density than is the liquid.

Based on the above assumptions, vapor is supplied by means of conduit 55 to the mixing zone of the bottommost contacting stage. From this point, it flows as a substantially continuous phase stream sequentially through each of the contacting stages 51 until it exits from the apparatus through conduit 56 wherein it may be handled as desired.

Liquid, on the other hand, is admitted to the apparatus through conduit 57 directly into a mixing zone of the topmost stage. As the liquid enters this mixing zone, it is dispersed throughout the stream of vapor by means of a suitable dispersion device such as a conventional splash plate 58. Upon impinging upon the splash plate, the liquid is broken up into fine particles and distributed throughout the vapor stream. It will be observed that a suitable mixing device is preferably provided in the mixing zone of each contacting stage in the apparatus.

As the vapor and liquid mixture in the uppermost stage travels laterally from the mixing zone to the separation zone, the liquid and the vapor are settled, again to form two distinct fluid phases. The vapor phase, as mentioned earlier, exits from the stage by means of conduit 56. Any entrained liquid in the vapor stream may be separated from the vapor by the use of various separation devices which provide good vapor-liquid separation at high superficial velocities. Illustrated in Fig. 5 is packing material 59 which may consist of wire mesh, finely divided solids, baffles, etc. It is not considered that a detailed discussion of such devices is necessary in the present description, inasmuch as these and other devices have been widely employed for related purposes.

The separated liquid exits from the settling zone 54 of the uppermost stage of the assembly 50 by collecting within transfer conduit 60. It will be observed that each one of the contacting stages, with the exception of the bottommost stage, is provided with a similar conduit. Referring, however, specifically to the uppermost stage, it will be observed that the liquid which collects within conduit 60 establishes a liquid seal between the top two contacting stages and thereby prevents vapor from bypassing these stages.

It will further be observed that the outlet end of each transfer conduit is provided with a perforated plate adapted to jet a plurality of fine streams within the stream of continuous stage vapor that enters the mixing zone of each stage. While the dispersion device illustrated for each of the stages, with the exception of the uppermost stage, is a perforated plate, it will be understood that a number of other suitable devices may be employed. For example, splash plates or baffles, spray nozzles, conventional types of tower packing, etc., may be used.

The discontinuous phase fluid, after passing sequentially through each of the contacting stages, is withdrawn from the apparatus by means of conduit 61.

As with the apparatus in Figures 1–4, a number of modifications may be incorporated within the apparatus illustrated in Fig. 5 without departing from the spirit or scope of the present invention. The individual contacting stages may be inclined or depressed slightly with respect to the horizontal; the stages may be provided with packing material or baffles adopted to perform a variety of functions; the individual stages may vary in cross-sectional area; the stages may vary from one another with respect to their length and/or cross-sectional areas; and the apparatus may be constructed of a variety of materials. It is particularly contemplated that the apparatus be constructed of conventionally available material such as metal pipe, tubing, conduit, etc. Furthermore, suitable heating means, pumps, valves, auxiliary piping, and the like, may be utilized as desired.

To summarize briefly, the present apparatus can be used for any vapor-liquid contacting service including the wide range of distillation, absorption, and extractive distillation processes. The conventional equipment for such services is a vertical cylindrical tower equipped with some means for countercurrent contacting of liquid and vapor. Normally, bubble cap trays (or similar type trays) are used across which the liquid flows. Vapor is introduced under the liquid surface through bubble cap slots or the equivalent, entering the liquid at a relatively high velocity—in the order of 10 times the superficial vapor velocity in the tower above the contacting trays. This high slot velocity produces considerable liquid spray above the tray, and this liquid spray is a common limitation on tower capacity. When the spray height approaches the next higher tray, entrainment through the next higher tray increases rapidly and causes "flooding" of the tower.

Slot velocity and resulting spray height have little significance in determining the allowable velocity in the present invention, since liquid-vapor separation in each stage is accomplished downstream of the mixing zone unhindered by the mixing zone turbulence. Allowable superficial velocities, as limited by gravity separation of the liquid droplets, fall somewhere between present tower superficial velocities and present bubble cap slot velocities which are in the range of 5–20 times the tower superficial velocities. Thus, it is apparent that very substantial increases in velocity and decreases in vessel diameter are accomplished. In addition, this invention is particularly well adapted for the addition of separating aids such as screens and various types of settling baffles which would permit still further velocity increases.

What is claimed is:

1. A multi-stage apparatus for contacting two incompletely miscible fluids of different specific gravities in a countercurrent relation between stages and in concurrent relation within each stage, wherein one of the fluids is present as a continuous phase and the other fluid as a discontinuous phase, which comprises, in combination: a plurality of vertically spaced substantially horizontal elongated tubular members, a plurality of return bend tubular conduits connecting adjacent horizontal tubular members sequentially at alternate ends thereof, thereby forming a continuous serpentine tubular passage through the plurality of said substantially horizontal tubular members and said return bend conduits, a plurality of substantially vertically disposed transfer conduits, each connecting a horizontal tubular member with an adjacent horizontal tubular member at points adjacent the ends thereof that are longitudinally opposite those ends of the same horizontal tubular members that are joined by a return bend conduit, each said transfer conduit terminating at the upper inside surface of the lower horizontal tubular member, and at the lower inside surface of the upper tubular member, to which that transfer conduit is attached, a first inlet conduit for introducing continuous phase fluid into a first horizontal tubular member at one end of the apparatus, a first outlet conduit for withdrawing continuous phase fluid from the last horizontal tubular member at the opposite end of the apparatus, a second inlet conduit for introducing discontinuous phase fluid into said last horizontal tubular member, a second outlet conduit for withdrawing discontinuous phase fluid from said first horizontal tubular member, and dispersion means associated with each transfer conduit and with said second inlet conduit, each of said horizontal tubular members being of sufficient length to permit separation of a dispersion of said fluid phases during longitudinal flow through said member, whereby when the inlet conduit for the lighter of the said phases is positioned in the lowermost horizontal tubular member and the inlet conduit for the heavier phase is positioned in the uppermost horizontal tubular member, said continuous phase fluid will flow by gravity difference through said entire serpentine passage from said first inlet conduit to said first outlet conduit, and said discontinuous phase fluid will flow through said second inlet conduit and the dispersion means associated therewith into said last horizontal tubular member, be dispersed in continuous phase fluid in said last tubular member, be separated from continuous phase fluid during flow longitudinally through said last tubular member, collect as a separate phase adjacent that inner surface of said last tubular member that communicates with the transfer conduit connecting the last tubular member with the adjacent tubular member of the series, and pass sequentially through each transfer conduit and associated dispersing means, being alternately dispersed in the continuous phase fluid and separated therefrom in each of said horizontal tubular members in the manner aforesaid, and finally flowing from the first tubular member through said second outlet conduit.

2. Apparatus as defined by claim 1 wherein said dispersion means comprises a perforated plate laterally disposed within each transfer conduit.

3. Apparatus as defined by claim 1 wherein said dispersion means comprises a baffle and weir arrangement within each transfer conduit.

4. Apparatus as defined by claim 1 including a baffle within at least one of said horizontal tubular members, the baffle extending from that surface adjacent which the discontinuous phase collects toward the vertically opposite surface, the baffle being positioned in a region intermediate the termination of the transfer conduit that communicates with said opposite surface and the termination of the return bend conduit that connects said last named horizontal tubular member with the next horizontal tubular member toward which said discontinuous phase flows, whereby by-passing of said discontinuous phase through said last named return bend conduit is prevented.

References Cited in the file of this patent
UNITED STATES PATENTS

| | | |
|---|---|---|
| 1,305,870 | Blyth et al. | June 3, 1919 |
| 1,651,354 | Alexander | Dec. 6, 1927 |
| 2,345,667 | Hachmuth | Apr. 4, 1944 |
| 2,375,730 | Caldwell et al. | May 8, 1945 |
| 2,400,378 | Stines | May 14, 1946 |
| 2,580,010 | Fenske et al. | Dec. 25, 1951 |
| 2,681,269 | Bergstrom | June 15, 1954 |
| 2,746,846 | Grunewald | May 22, 1956 |
| 2,752,229 | Brown et al. | June 26, 1956 |